UNITED STATES PATENT OFFICE.

GERHARD NICOLAAS VIS, OF PARIS, FRANCE.

PROCESS FOR REGENERATING CATALYZERS CONTAINING NICKEL AND ITS COMPOUNDS WHICH HAVE BEEN EMPLOYED FOR THE HYDROGENATION OF FATTY BODIES OR OTHER ORGANIC PRODUCTS.

1,306,871. Specification of Letters Patent. Patented June 17, 1919.

No Drawing. Application filed November 21, 1917. Serial No. 203,189.

*To all whom it may concern:*

Be it known that I, GERHARD NICOLAAS VIS, of 10 Rue de Vinne, Paris, France, chemist, have invented a new and useful improvement in processes for regenerating catalyzers containing nickel and its compounds which have been employed for the hydrogenation of fatty bodies or other organic products, which improvement is fully set forth in the following specification.

It is well known that catalyzers containing nickel and its compounds, such as nickel oxid, after being employed for the hydrogenation of fatty bodies or other organic products lose after time their catalytic power; they become inactive and hydrogenation ceases.

As nickel is of great commercial value it is very important to recover it from the spent catalyzers.

The following process allows this recovery to be effected in a very simple manner, and the resulting nickel oxid or metallic nickel, may be again employed as a catalyzer without further treatment.

The spent catalyzer is, by any method (solution, for example), previously freed either wholly or for the greater part from grease or stearic acid.

The product thus obtained is then heated with an excess of air in a suitable receptacle provided with means for stirring the mass, such as a crucible or a pipe having in it a worm; the organic products, which may be present in the heated product, are burnt off at the same time as the nickel or the suboxids of nickel which may be present, or be formed, are oxidized. The mass is then heated to a red heat while continuously stirring to maintain free access of air. After cooling the product thus obtained is a catalyzer consisting of regenerated nickel oxid.

If necessary the nickel oxid thus obtained is washed in hot water in order to free it from soluble products which may have accumulated during its employment. The product thus washed is again heated to a red heat and may be used as a catalyzer.

The regenerated oxid of nickel may be transformed into suboxid of nickel which is particularly active for the hydrogenation of fatty bodies by heating it to a temperature near to 300° C. in about its weight of oil in a current of hydrogen if need be for several hours.

A catalyzer consisting of metallic nickel is obtained either by merely reducing the nickel oxid obtained as above described at a low temperature, or by heating the product which may still have organic products adhering to it without access of air or in the presence of a reducing agent.

Claim—

The process for regenerating nickel catalyzers employed for hydrogenation of fatty bodies, consisting in treating the spent catalyzer with a solvent to remove fatty bodies, heating the residue in presence of an excess of air to destroy any organic matter remaining, washing the roasted product in water to free it from soluble impurities, and transforming the product into suboxid of nickel by heating the same in oil at about 300° C. through which hydrogen is passed.

In testimony whereof I have signed this specification in the presence of two subscribing witnesses.

GERHARD NICOLAAS VIS.

Witnesses:
 CHAS. P. PRESSLY,
 GASTON DE MESTRAL.